June 22, 1965 F. H. LAMBERT 3,190,501
FILLER, PARTICULARLY FOR FOAM MOLDING
Filed Jan. 22, 1962 2 Sheets-Sheet 1
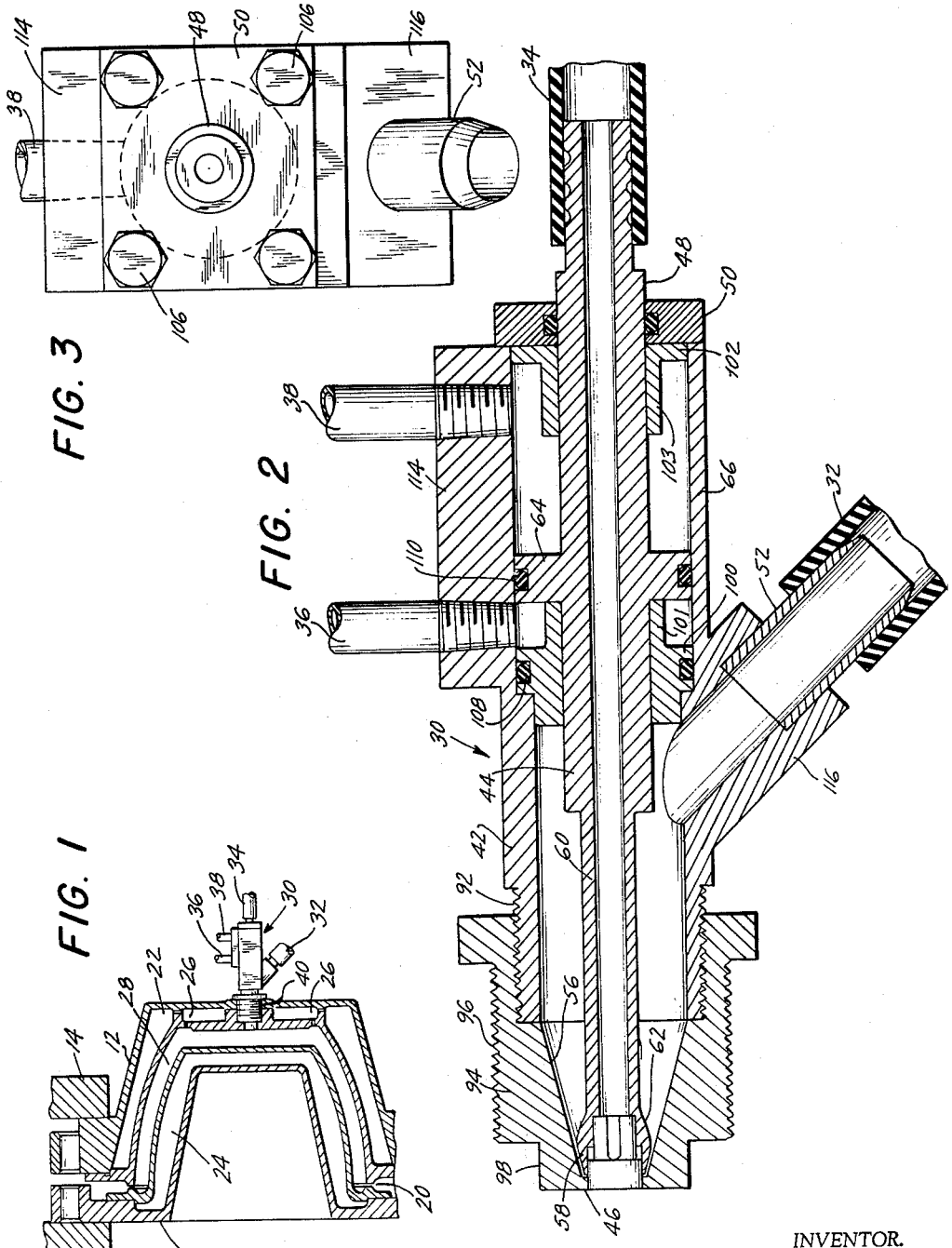
INVENTOR.
FRANK H. LAMBERT
BY
ATTORNEYS

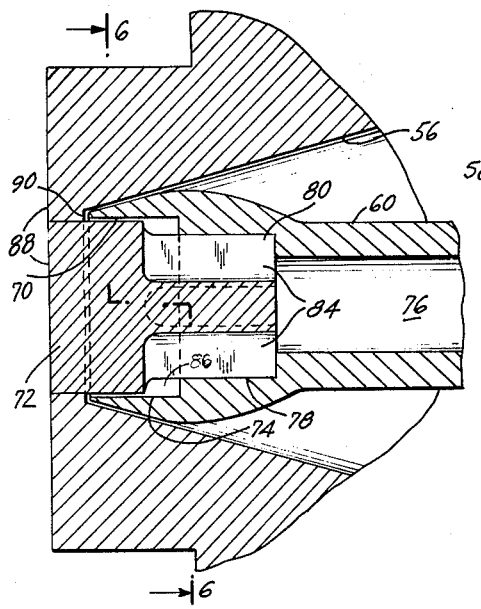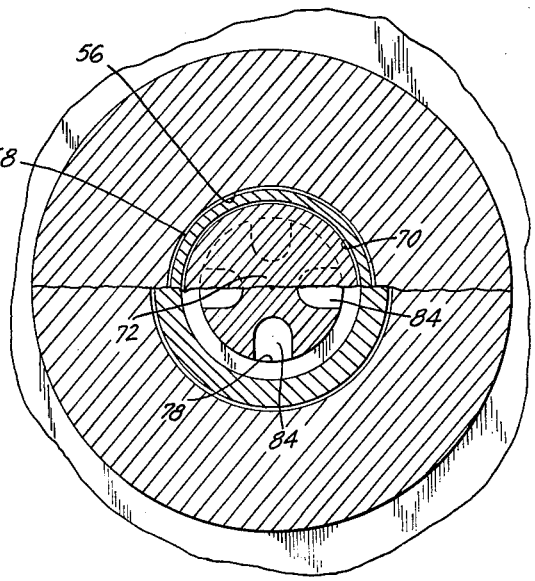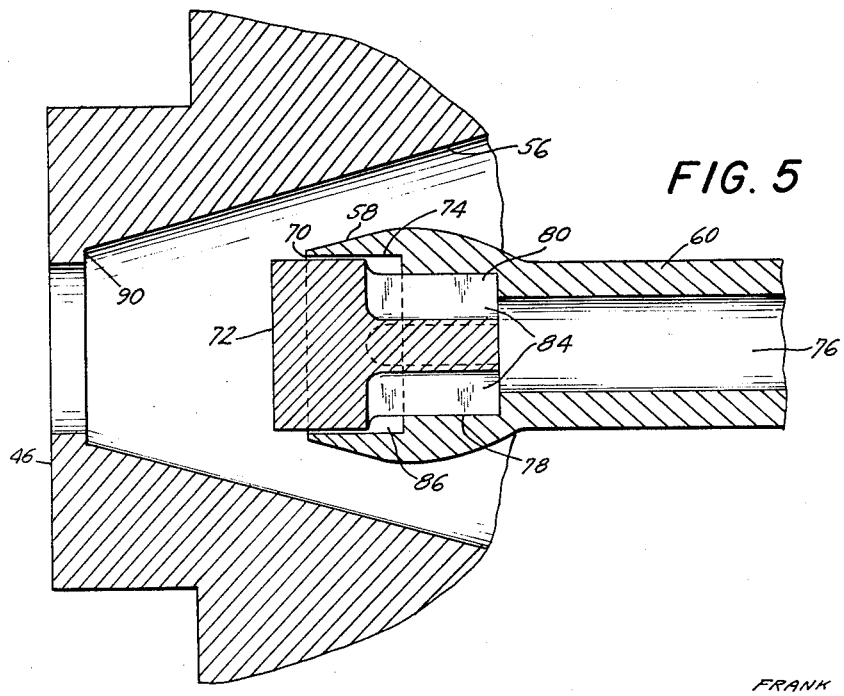

United States Patent Office 3,190,501
Patented June 22, 1965

3,190,501
FILLER, PARTICULARLY FOR FOAM MOLDING
Frank H. Lambert, Pompton Lakes, N.J., assignor to Champlain-Zapata Plastics Machinery, Inc., Caldwell, N.J., a corporation of Delaware
Filed Jan. 22, 1962, Ser. No. 167,863
8 Claims. (Cl. 222—193)

This invention relates to fillers, and more particularly fillers used for foam molding in enclosed or shaped molds.

In foam molding, pellets of plastic material (typically polystyrene) are employed, the material having previously been charged with a propellant gas. When such pellets are heated and softened, the expansion of the propellant gas blows each pellet into a much larger and very light weight bead. These beads are conveyed to a mold to fill the same, and there they are further heated to cause them to fuse or coalesce, and to provide a smooth skin for the molded article. The mold is chilled, and the somewhat hardened product then is removed from the mold.

The expanded beads have been loaded into the mold in various ways, an important one of which is the use of a nozzle or so called "filler" affixed to the mold, and receiving a supply of compressed air which flows through the nozzle and through the mold (temporarily cracked open for this purpose), and the flow of which draws expanded beads to the nozzle and into the mold by a Venturi or suction action. The general object of the present inventon is to improve such fillers.

A more particular object is to provide a filler in which the point at which the reduced pressure or vacuum manifests itself is located immediately at or exceedingly close to the mold cavity, for greatest efficiency. A further object is to provide a convergent passage at the mold. These features produce maximum bead velocity and thorough filling of the mold.

A still further object of the invention is to so design the filler that the air which causes flow of the beads also serves to cool the valve rod of the filler. Another object is to devise a filler which is relatively compact in dimension, and the valve rod of which may be opened or closed by a movement which is only a small fraction of that previously required.

An additional object of the invention is to make a filler which will work well over a wide density range of the beads. Still another object is to provide a filler which does not readily clog with small beads which have expanded only a little or not at all. A still further object is to provide a filler which is economical in the use of air.

To accomplish the foregoing general objects, and other more specific objects which will hereinafter appear, the invention resides in the filler elements and their relation one to another, as are hereinafter more particularly described in the following specification. The specification is accompanied by a drawing in which:

FIG. 1 is a fragmentary section through a mold having a filler embodying feature of the invention, drawn to greatly reduced scale;

FIG. 2 is a section through the filler alone;

FIG. 3 is a rear end view of the filler;

FIG. 4 is a fragmentary section through the forward end of the nozzle drawn to enlarge scale, with the valve rod in forward or closed position;

FIG. 5 is a similar view, but showing the valve rod in retracted or open position; and FIG. 6 is a fragmentary transverse section taken approximately in the plane of the line 6—6 of FIG. 4.

Referring to the drawing, and more particularly to FIG. 1, the mold may be of a known type used for foam molding, and arranged for heating and cooling in alternation. The stationary part 12 of a mold is secured to a stationary press platen 14. The movable part 16 of the mold is secured to a movable press platen 18. The platens preferably hold the mold in vertical position, and are moved horizontally, so that the parting face 20 is vertical. Both halves of the mold are jacketed, as shown at 22 and 24, and these jackets have inlets and outlets (not shown) for steam and water. Usually, flexible hoses from the mold are connected to a valve system to admit a supply of steam to the mold when it is being heated, and a subsequent supply of water instead of steam when it is being cooled. Tiny holes or slits indicated at 26 may be provided through the inner wall of the jacket so that some of the steam may be bled to the beads in the mold cavity 28. In some molds coils are employed, rather than jackets.

The press is arranged to not only close or open, but also to provide a position in which the mold is cracked very slightly open at the parting face, as indicated at 20. The mold cavity 28 is filled through a nozzle or so-called filler, generally designated 30. The expanded beads reach the nozzle through a pipe or flexible hose 32. Compressed air is supplied through a pipe or flexible hose 34. The opening and closing of the filler may be controlled by air supplied through pipes 36 and 38. When necessary, a filler can be removed from one mold and used in another, the threaded connection therebetween being indicated at 40.

Referring now to FIGS. 2 and 3 of the drawing, the filler comprises a hollow nozzle body 42, and a hollow valve rod 44 movable axially in body 42 to close the forward end 46 of the body 42. The rear end 48 of the valve rod passes through the rear end 50 of body 42. There is a connection 52 at the side of the body 42 for flow of beads to the hollow interior. An air connection 34, preferably a flexible hose, leads to the rear end 48 of the valve rod. The forward end of the valve rod has a constricted orifice for air discharge at high velocity, in order to develop a suction which draws beads through the side connection 52. The constricted orifice is too small to be visible in FIG. 2, but is shown in FIGS. 4, 5 and 6, described later.

In FIG. 2 the hollow interior of body 42 is convergent at its forward end, as shown at 56. The forward end 58 of the valve rod is similarly convergent. When the portion 60 of the valve rod behind the converging end 58 is smaller in diameter, as here shown, the transition surface 62 therebetween is preferably given a gradual slope in order not to impede the desired smooth flow of beads.

The intermediate portion 44 of the valve rod has a piston 65 therearound, and the surrounding portion 66 of the body 42 is shaped to act as a cylinder which slidably receives the piston 64, thus providing mechanism for moving the valve rod between its forward closed position and a retracted open position.

Referring now to FIGS. 4, 5 and 6 of the drawing, the constricted orifice is preferably an annular slit 70 which has a width of only some thousandths of an inch. Considered in greater detail, the slit 70 preferably is provided by inserting a core 72 (FIG. 5) in a cylindrical reentrant passage 74 in the convergent end 58 of the hollow valve rod. The passage through the valve rod is indicated at 76. This is enlarged somewhat at 78 to receive the shank portion 80 of core 72. The shank portion is fluted or longitudinally slotted to provide air passages 84 of adequate cross-sectional area for free flow of air from the hollow portion 76 of the valve rod through the radial slotted passages 84 to the annular space 86 immediately behind the cylindrical core 72. The air then flows through the annular constricted orifice 70 in a high velocity jet which attracts the beads to the forward end of the filler where they pass directly into the mold cavity.

The core 72 is preferably cylindrical, and it preferably protrudes somewhat from the convergent portion 58 of the valve rod. The protruding part may be employed to effectively close the mold and to provide a flush surface, as indicated at 88 in FIG. 4, and also shown in FIGS. 1 and 2. At this time the forward end of the convergent portion 58 could reach and bear against the step 90, but I prefer to space it back somewhat from the step 90. When spaced back, the flow of air may be continued if desired even after the flow of beads is stopped, and the resulting back flow around the outside of the valve rod 60 (FIG. 2) and through the bead inlet 52, moves residuary beads back out of the nozzle body. This is desirable lest they coalesce, with danger of obstructing flow in later cycles.

Reverting to FIGS. 4 and 5, the forward or closed position of FIG. 4 is to be contrasted with the open position of FIG. 5, in which the valve rod has been retracted to permit flow of air and beads through the tip 46 of the filler and into the mold.

Reverting now to FIG. 2, the nozzle body 42 is preferably made of a main part terminating in a threaded end 92, and a threaded bushing or nose portion 94 which is screwed on the thread 92. The part 94 itself has an external thread 96 which is received in the mold, and it is preferably stepped at its forward end, as shown at 98. The mold is matingly shaped, as will be seen in FIG. 1, so that the inner end 46 comes flush with the surface of the mold cavity.

The cylinder portion 66 of the filler body is closed at its forward end by a part 100 which may be slid into position through the open rear end of the cylinder. It is closed at its rear end by a cylindrical part 102 which may be formed integrally with, or which may be separable from but held in position by an end plate 50. The latter is preferably square and is bolted in position by four bolts, as indicated at 106 in FIG. 3. Appropriate gaskets, in this case O rings, are provided at 108, 110, and 112 (FIG. 2). Air pipes 36 and 38 are screwed into mating holes in a thickened wall portion 114 of the cylinder. The side connection 52 may be a pipe nipple secured in an offset projection 116 of body 42. For very limited manufacture the parts 114 and 116 may be added to the body 42, as by welding, but for normal manufacture the parts 114 and 116 are preferably cast integrally with the body 42. The sleeve portions 101 and 103 of the ends 100 and 102 are dimensioned to limit the piston stroke to a desired amount. The part 101 determines the flush fit of the valve rod at the forward end of the nozzle.

It will be understood that the piston 64 is double acting, and that the pipes 36 and 38 are connected to any suitable four-way valve to cause the valve rod to be moved between its forward closed position, and its retracted open or mold filling position. Air supply to pipe 34 may be made intermittent, under control of a suitable air valve.

In prior fillers the junction point between the air stream and the approaching beads has been located well back of the nozzle, and considerable air has been discharged through slits located beyond the junction and ahead of the mold, with consequent loss of air and loss of bead velocity. Moreover, a solid valve rod has been used, and it has been retracted to a point behind the junction point to open the filler, thereby necessitating a valve rod stroke of say five inches, in contrast with the present filler which requires a stroke of less than an inch. In consequence the overall dimension of the present filler is much smaller than that of earlier fillers, in addition to being more efficient in the use of air, and in its effectiveness in filling the mold, owing to the location of the junction point immediately at or very close to the mold cavity.

Prior fillers have proved troublesome because of a tendency of small beads which have only partially expanded, entering and clogging the air passages or slots. The present filler has an annular slit which is adequate in flow area, and yet which is so narrow, say 0.007 of an inch in width, that even small or unexpanded beads cannot enter the slit and fill the same. Moreover, the beads are blown away from rather than toward the slit.

By actual test it has been found that this filler will successfully handle beads over a very wide range of density, extending all the way from virtually raw or unexpanded beads having a density of say 35 to 40 pounds per cubic foot, to fully expanded beads having a density of only say one pound per cubic foot.

One basic principle of the new filler is that the flow of air causing the vacuum fill is at a position immediately at the cavity. This is entirely different in principle from other fillers previously developed, because they locate the junction point or vacuum in a position well behind the mold cavity, and allowance then had to be made for the ejection of a large percentage of the air itself, approximately seventy percent of the air, ahead of the mold. The beads going into the mold therefore tend to lose some of their velocity.

By placing the air orifice almost at the entry to the mold cavity itself, the maximum velocity of beads is continued in the mold cavity. All of the air being used in this process is bled off or released at the parting line of the mold, or passes through the mold cavity and mold. This helps carry the beads and helps fill the mold.

The new design involves not only positioning the air orifice as closely as possible to the mold entry, but also the provision of an extremely thin slot or orifice at the end of the valve rod, with consequent economy in the consumption of air, and resistance to entry of and obstruction by beads.

The filler may be used with molds which have either chambers (jackets) or coils for heating and cooling. The filler itself is cooled by the air stream, but where necessary, the outside of the filler may additionally be jacketed for cooling by water or other means. When back flow of air is maintained while the filler is closed, it helps maintain cooling of the filler.

It is believed that the construction and operation of the present improved filler, as well as the advantages thereof, will be apparent from the foregoing detailed description. It will also be apparent that while the invention has been described in a preferred form, changes may be made in the structure shown without departing from the scope of the invention, as sought to be defined in the following claims.

I claim:

1. A filler nozzle adapted to be connected to a molding device for supplying plastic beads to a mold cavity therein, said filler nozzle comprising
    (a) an elongate hollow body having one end portion thereof adapted to be communicatively connected to the mold cavity and having an interior wall including a cylindrical first portion and a conical second portion adjacent to and converging toward said one end of said hollow body,
    (b) means communicatively connected to said cylindrical first portion of said hollow body and adapted to be connected to a source of plastic beads for supplying plastic beads to the interior of said hollow body, and
    (c) an elongate hollow valve rod disposed axially within said hollow body with one end portion thereof disposed within said conical second portion of said hollow body, said valve rod being adapted to be connected to a source of compressed air and having a constricted orifice in said one end portion thereof for air discharge at high velocity toward said one end of said hollow body, said valve rod being movable between an open position wherein said one end thereof is spaced a small predetermined distance rearwardly from said one end of said hollow body but forwardly of said bead supply means and air is discharged from the orifice in said one end thereof closely adjacent to and through said one end of said body to draw beads through said bead supply means and to carry the same through said one end of the body, and a closed position wherein said one end portion of said valve rod closes the opening through said one end of said hollow body to the passage of both air and beads.

2. A filler nozzle according to claim 1 wherein said one end portion of said valve rod includes means cooperable with said interior wall of said hollow body for terminating the flow of air and beads through said one end of said body when said valve rod is in closed position without terminating the discharge of air from said orifice so that air flowing from said orifice forces any residual plastic beads remaining in said conical portion rearwardly in said hollow body.

3. A filler nozzle according to claim 1 wherein said hollow body includes a cylindrical third portion between the small end of said conical portion and said one end of said hollow body, said cylindrical third portion being of lesser diameter than the small end of said conical portion to define a shoulder on the interior wall at the juncture thereof, and wherein said one end portion of said valve rod includes means for closing said cylindrical third portion when said valve rod is in closed position while spacing said orifice rearwardly of said shoulder and said one end portion of said valve rod from said conical portion of the interior wall so that air being discharged from said orifice strikes said shoulder and is directed rearwardly therefrom.

4. A filler nozzle according to claim 1 including air-operated means operatively connected to said valve rod for moving said valve rod between said open and closed positions.

5. A filler nozzle adapted to be connected to a molding device for supplying plastic beads to a mold cavity therein, said filler nozzle comprising
  (a) an elongate hollow body having one end portion thereof adapted to be communicatively connected to the mold cavity and having an interior wall including a cylindrical first portion, a conical second portion connected to said first portion and converging toward said one end of said hollow body, and a cylindrical third portion extending between the small end of said conical portion and said one end of said hollow body, said cylindrical third portion being of lesser diameter than the small end of said conical portion to provide a shoulder in the interior wall at the juncture thereof,
  (b) means communicatively connected to said cylindrical first portion of said hollow body and adapted to be connected to a source of plastic beads for supplying plastic beads to the interior of said hollow body, and
  (c) an elongate hollow valve rod disposed axially within said hollow body with one end portion thereof disposed within said conical second portion of said hollow body, said valve rod being adapted to be connected to a source of compressed air and having an annular orifice in said one end portion thereof for air discharge at high velocity toward said one end of said hollow body, said valve rod including a protruding cylindrical portion of comparable diameter to said cylindrical third portion of said hollow body and adapted to be positioned within the cylindrical third portion of said hollow body, said valve rod being movable between an open position wherein said one end portion thereof is spaced a small predetermined distance rearwardly from the small end of said conical portion but forwardly of said bead supply means so that the air discharged from said annular orifice does not have the velocity thereof materially decreased before the same passes out of the hollow body, the high velocity air serving to draw beads through said bead supply means and to carry the same through said one end of the hollow body, and a closed position wherein said cylindrical protruding portion of said valve rod is disposed within and closes said cylindrical third portion of said hollow body and spaces said orifice rearwardly from said shoulder and the periphery of said one end portion of said valve rod from said conical portion of the interior wall of said hollow body so that air may continue to be discharged from said orifice and will strike said shoulder and be directed rearwardly in said conical portion of said hollow body to force any residual plastic beads therein rearwardly in said hollow body.

6. A filler nozzle according to claim 5 wherein an intermediate portion of said valve rod has a piston mounted therearound for movement therewith and the surrounding portion of said hollow body serves as a cylinder to operatively receive said piston including means sealing the portions of said body receiving the piston therein from said cylindrical first portion of said hollow body, and including air supply means adapted to be connected to a compressed air source and communicatively connected to the interior of said body on opposite sides of said piston for selectively moving said valve rod between said open and closed positions.

7. A filler nozzle according to claim 5 wherein said annular orifice in said valve rod has a width on the order of .007 of an inch to prevent clogging thereof by plastic beads.

8. A filler nozzle adapted to be connected to a molding device for supplying plastic beads to a mold cavity therein, said filler nozzle comprising
  (a) an elongate hollow body having one end portion thereof adapted to be communicatively connected to the mold cavity and having an interior wall including a cylindrical first portion, a conical second portion connected to said first portion and converging toward said one end of said hollow body, and a cylindrical third portion extending between the small end of said conical portion and said one end of said hollow body, said cylindrical third portion being of lesser diameter than the small end of said conical portion to provide a shoulder in the interior wall at the juncture thereof,
  (b) means communicatively connected to said cylindrical first portion of said hollow body and adapted to be connected to a source of plastic beads for supplying plastic beads to the interior of said hollow body,
  (c) an elongate hollow valve rod disposed axially within said hollow body and having a conical portion at one end thereof comparable to said conical portion of said hollow body, said conical end portion of said valve rod being disposed within said conical second portion of said hollow body, said valve rod being adapted to be connected to a source of compressed air and having the opening therethrough enlarged at said conical end portion thereof to a diameter exceeding the diameter of said cylindrical third portion of said hollow body, said valve rod including a protruding cylindrical portion of comparable diameter to said cylindrical third portion of said hollow body disposed within the enlarged opening in said one end portion of said valve rod to define a constricted annular orifice in said one end portion of said valve rod, the difference in diameters between said enlarged opening in and said protruding cylindrical portion of said valve rod being on the order of .007 of an inch to prevent clogging of the constricted orifice by plastic beads, said valve rod being movable between an open position wherein said one end portion thereof is spaced a small predetermined distance rearwardly from the small end of said conical portion but forwardly of said bead supply means so that the air being discharged from said orifice does not have the velocity thereof materially decreased before the same passes out of said hollow nozzle body, the high velocity air serving to draw beads through said bead supply means and to carry the same through said one end of the hollow body, and a closed position wherein said cylindrical protruding portion of said valve rod is disposed within and closes said cylindrical portion of said hollow body and spaces said orifice rearwardly from said shoulder and said conical end portion of said valve rod from said conical portion of the interior wall of said hollow body so that air may continue to be discharged from said orifice and will strike said shoulder and be directed rearwardly in said conical portion of said hollow body to force any residual plastic beads therein rearwardly in said hollow body, and (d) air-operated means operatively connected to said valve rod for moving the valve rod between said open and closed positions comprising a piston mounted on said valve rod for movement therewith, the surrounding portion of said hollow body serving as a cylinder to said piston and including means sealing the portion of said body receiving the piston therein from said cylindrical first portion of said hollow body, and air-supply means adapted to be connected to a compressed air source and communicatively connected to the interior of said body on opposite sides of said piston for selectively moving said valve rod between the open and closed positions.

References Cited by the Examiner

UNITED STATES PATENTS

| | | | |
|---|---|---|---|
| 861,193 | 7/07 | McCabe et al. | 302—25 |
| 1,029,718 | 6/12 | Rohrbacher | 222—193 |
| 2,805,147 | 9/57 | Schreiber | 75—53 |
| 3,028,625 | 4/62 | Dawson. | |
| 3,042,967 | 7/62 | Edberg. | |

LOUIS J. DEMBO, *Primary Examiner.*

ROBERT F. WHITE, ERNEST A. FALLER, Jr.,
*Examiners.*